US011897044B2

(12) United States Patent
Suzuki et al.

(10) Patent No.: US 11,897,044 B2
(45) Date of Patent: Feb. 13, 2024

(54) CUTTING MACHINE

(71) Applicant: MAKITA CORPORATION, Anjo (JP)

(72) Inventors: Yukinori Suzuki, Anjo (JP); Toshiyuki Kani, Anjo (JP)

(73) Assignee: MAKITA CORPORATION, Anjo (JP)

( * ) Notice: Subject to any disclaimer, the term of this patent is extended or adjusted under 35 U.S.C. 154(b) by 268 days.

(21) Appl. No.: 17/504,704

(22) Filed: Oct. 19, 2021

(65) Prior Publication Data

US 2022/0176476 A1 Jun. 9, 2022

(30) Foreign Application Priority Data

Dec. 8, 2020 (JP) ................................. 2020-203301

(51) Int. Cl.
*B23D 45/04* (2006.01)
*B27B 5/24* (2006.01)
*B27B 5/29* (2006.01)

(52) U.S. Cl.
CPC .............. *B23D 45/044* (2013.01); *B27B 5/24* (2013.01); *B27B 5/29* (2013.01)

(58) Field of Classification Search
CPC ........ B23D 45/048; B23D 45/44; B27B 5/29; B27B 5/25; B27B 5/24
USPC ......................................................... 83/471
See application file for complete search history.

(56) References Cited

U.S. PATENT DOCUMENTS

| 6,662,697 | B1 | 12/2003 | Chen | |
|---|---|---|---|---|
| 7,549,360 | B2 | 6/2009 | Aoyama | |
| 2004/0074363 | A1* | 4/2004 | Svetlik | B27B 5/29 83/676 |
| 2006/0000329 | A1* | 1/2006 | Terashima | B23D 59/002 83/490 |

FOREIGN PATENT DOCUMENTS

| EP | 1 935 543 A1 | 6/2008 |
|---|---|---|
| JP | 2006-044044 A | 2/2006 |
| JP | 5391840 B2 | 1/2014 |

* cited by examiner

*Primary Examiner* — Nhat Chieu Q Do
(74) *Attorney, Agent, or Firm* — Oliff PLC

(57) ABSTRACT

A fine adjuster for finely adjusting the lateral tilt position of a cutting machine body has improved operability. A cutting machine includes a table, a cutting machine body, a tilting member supporting the cutting machine body in a manner laterally tiltable relative to the table, a tilting locking member, and a lever member to adjust the tilt position of the cutting machine body. The lever member includes a fulcrum coupled to the table in a manner rotatable about an axis, a load point coupled to the tilting member, and an effort point extending from the fulcrum and located at a distance from the fulcrum greater than a distance between the fulcrum and the load point.

16 Claims, 15 Drawing Sheets

CUTTING MACHINE

CROSS-REFERENCE TO RELATED APPLICATIONS

This application claims the benefit of priority to Japanese Patent Application No. 2020-203301, filed on Dec. 8, 2020, the entire contents of which are hereby incorporated by reference.

BACKGROUND

1. Technical Field

The present disclosure relates to a tabletop cutting machine (cutting machine).

2. Description of the Background

A tabletop cutting machine (cutting machine) includes a table on which a workpiece is placeable and a cutting machine body including a disc-shaped blade. To perform a cutting process, the disc-shaped blade cuts into a workpiece placed on the table from above. The cutting machine includes the cutting machine body tiltable rightward or leftward to obliquely cut into a workpiece. Various techniques have been developed for positioning the cutting machine body at an intended tilt angle.

A tilting positioner described in Japanese Unexamined Patent Application Publication No. 2006-44044 (hereafter, Patent Literature 1) includes an intermediate base between a tilting part for a cutting machine body and a tilting support supporting the cutting machine body in a tiltable manner. The position of the intermediate base in a lateral tilting direction can be adjusted while a locking screw is being loosened. With the intermediate base locked with the locking screw tightened, the tilt angle of the cutting machine body can be finely adjusted while the tightening amount of a positioning screw is being adjusted. After the fine adjustment, the cutting machine body is locked at the angle at which the cutting machine body is positioned by tightening a body locking screw.

A tilting positioner described in European Patent Application Publication No. 1935543 (hereafter, Patent Literature 2) includes an operation part rotatable about an axis parallel to a tilting shaft of a cutting machine body. The operation part is rotated to rotate a pinion gear, thus changing the position at which the pinion gear and a rack near a tilting support mesh with each other. In this manner, the tilt angle of the cutting machine body can be finely adjusted. After the fine adjustment, the cutting machine body is locked at the angle at which the cutting machine body is positioned by tightening a body locking screw.

BRIEF SUMMARY

In the positioner described in Patent Literature 1, the intermediate base is to be unlocked by loosening the locking screw when no fine adjustment is performed for the tilt angle. This cancel operation is time-consuming and troublesome. The positioner described in Patent Literature 2 may include a large rack. For a smaller rack, the positioner may use multiple intermediate gears that can complicate the structure.

One or more aspects of the present disclosure are directed to a fine adjuster for adjusting the tilt position of a cutting machine body with improved operability and a simple structure.

A first aspect of the present disclosure provides a cutting machine, including:
a table on which a workpiece is placeable;
a cutting machine body vertically movable relative to the table;
a tilting member supporting the cutting machine body in a manner laterally tiltable relative to the table;
a tilting locking member configured to lock the cutting machine body at a tilt position in an unlockable manner; and
a lever member operable to adjust the tilt position of the cutting machine body in an unlocked state of the tilting locking member, the lever member including
a fulcrum directly or indirectly coupled to the table in a manner rotatable about an axis,
a load point coupled to the tilting member, and
an effort point extending from the fulcrum and located at a distance from the fulcrum greater than a distance between the fulcrum and the load point.

A second aspect of the present disclosure provides a cutting machine, including:
a table on which a workpiece is placeable;
a cutting machine body vertically movable relative to the table;
a tilting member supporting the cutting machine body in a manner laterally tiltable relative to the table;
a tilting locking member configured to lock the cutting machine body at a tilt position in an unlockable manner; and
a lever member operable to adjust the tilt position of the cutting machine body in an unlocked state of the tilting locking member, the lever member including
a fulcrum coupled to the table in a manner rotatable about an axis,
a load point coupled to the tilting member, and
an arm extending from the fulcrum.

DETAILED DESCRIPTION

Embodiments of the present disclosure will be described with reference to FIGS. 1 to 15. A tabletop cutting machine (cutting machine) 1 according to the present embodiment is a sliding circular saw. As shown in FIGS. 1 to 4, the cutting machine 1 includes a base 2, a table 3, and a cutting machine body 10. The base 2 is placed on a surface such as a tabletop or a floor surface F. The table 3 receives a workpiece. A user is in front of the cutting machine 1 to perform cutting. Hereafter, the front-rear direction with respect to the components and structures is defined as the front being closer to the user. The up-down (or vertical) and right-left (or lateral) directions with respect to the components and structures are defined as viewed from the user.

Figure 3:
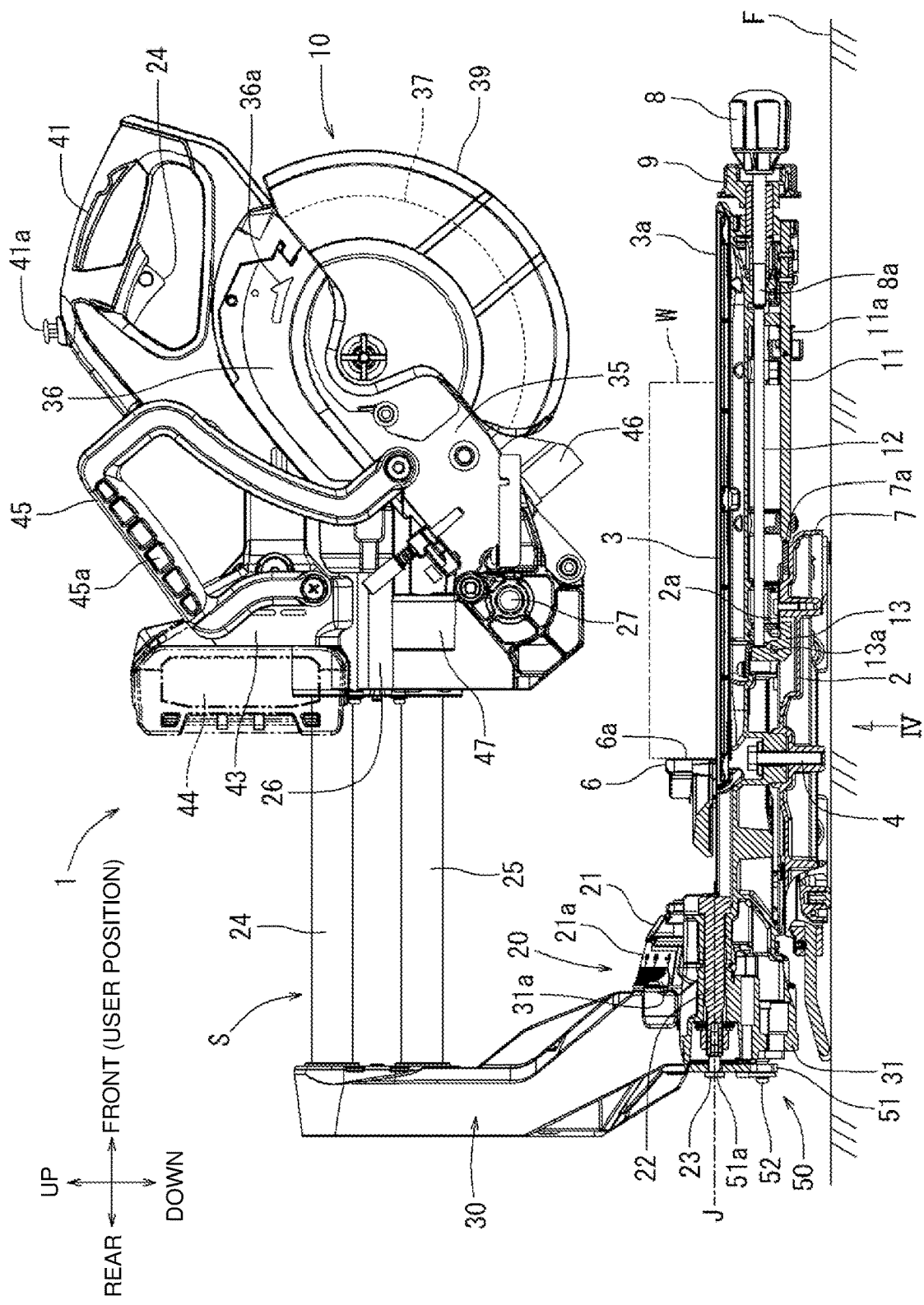
FIG. 3 is a left side view of the cutting machine, showing a base, a table, and a tilting support in a longitudinal cross section.
Figure 4:
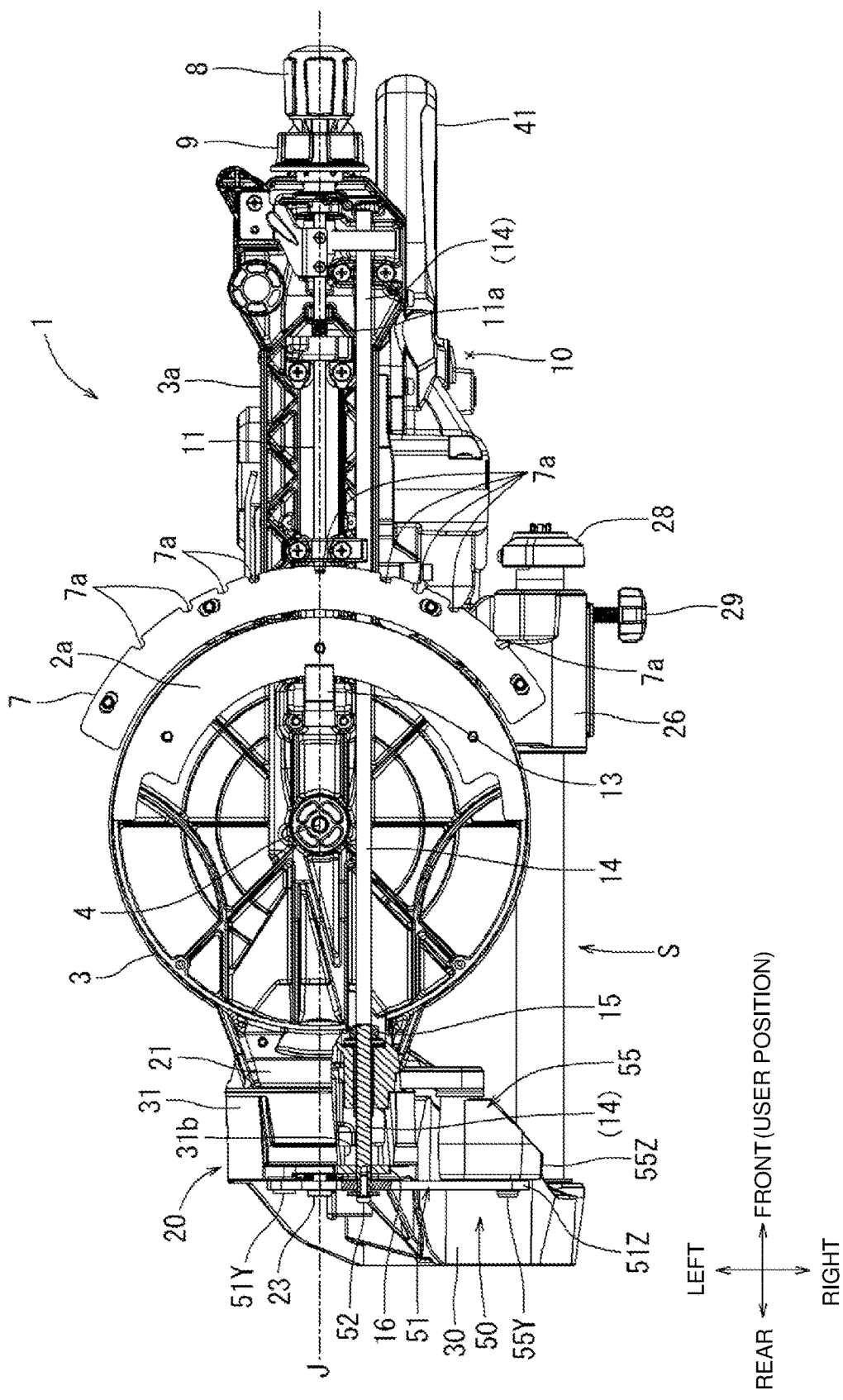
FIG. 4 is a bottom view of the cutting machine as viewed in the direction indicated by arrow IV in FIG. 3 without showing the base.

The table 3 is substantially circular in a plan view and has a horizontal, flat upper surface. A workpiece W is placed on the upper surface of the table 3. As shown in FIGS. 3 and 4, the table 3 is supported above the base 2 in a manner horizontally rotatable about a support shaft 4. A tilting support 20 is located on the rear of the table 3. The cutting machine body 10 is supported in a manner laterally tiltable with the tilting support 20. The tilting support 20 will be described in detail later.

The table 3 includes a table extension 3a at its front. The table extension 3a is elongated frontward. The table extension 3a has its upper surface flush with the upper surface of the table 3. A workpiece W is placeable on the upper surface of the table extension 3a. The table extension 3a has a blade slot 3b in its upper surface. During cutting, a blade 37 called a tipped saw blade moves downward through the blade slot 3b.

Auxiliary tables 5 are located on the right and left of the table 3. The right and left auxiliary tables 5 are respectively integral with right and left portions of the base 2. The auxiliary tables 5 have their upper surfaces flush with the upper surface of the table 3. A large workpiece W is placeable on the upper surfaces of the table 3 and the auxiliary tables 5.

A positioning fence 6 is located above the table 3 and the right and left auxiliary tables 5. The positioning fence 6 is a wall that extends laterally and upward. The positioning fence 6 is supported on the right and left auxiliary tables 5. The positioning fence 6 has a positioning surface 6a on its front surface. The positioning surface 6a is located in a vertical plane including the rotation center of the table 3 (the axis of the support shaft 4). As shown in FIG. 3, a workpiece W placed on the table 3 comes in contact with the positioning surface 6a to be positioned in the front-rear direction.

The table 3 receives a first table locking unit and a second table locking unit for locking the horizontal rotational position. As shown in FIGS. 3 and 4, an arc-shaped first lock plate 7 is located within substantially a front half area of the base 2. The first lock plate 7 has angle graduations to indicate the horizontal angle of the table 3. The first lock plate 7 has multiple positioning recesses 7a in the rotational direction of the table 3. Any one of the positioning recesses 7a receives a distal end of a positioning pin 11 to lock the table 3 at an angle. The positioning recesses 7a in the first lock plate 7 are spaced apart at appropriate angular intervals. The rotational position of the table 3 is locked at angular intervals defined by the positioning recesses 7a. The positioning pin 11 is urged toward a lock position by a compression spring 11a. The locking and unlocking operations with the first table locking unit are performed by moving upward or downward an operation lever (not shown) located near a front portion of the table extension 3a.

The rotational position of the table 3 is locked by, in addition to the first table locking unit using the positioning pin 11 and the positioning recesses 7a that receive the positioning pin 11, the second table locking unit that uses a second lock plate 2a located nearer the base 2 and a pressing member 13 holding the second lock plate 2a with a screw force.

The table extension 3a receives, in addition to the operation lever, a table locking member 8 and a tilting locking member 9 on its front surface. The table locking member 8 is rotated to cause the second table locking unit to perform a locking or unlocking operation. As shown in FIG. 3, the table locking member 8 has a threaded shaft part 8a screwed into the lower surface of the table extension 3a. An actuation shaft 12 is pressed rearward toward the rotation center of the table 3 under a screw force from the threaded shaft part 8a. The actuation shaft 12 extends above and parallel to the positioning pin 11 in the first table locking unit. The actuation shaft 12 has its rear end pressed against an upper portion of the pressing member 13. The pressing member 13 is located on the lower surface of the table 3 and is vertically pivotable about a support shaft 13a. Thus, when the actuation shaft 12 is pressed rearward under a screw force, the pressing member 13 pivots about the support shaft 13a counterclockwise in the figure.

The pressing member 13 has its lower portion pressed against the lower surface of the second lock plate 2a under a screw force. This causes the second lock plate 2a to be held between the pressing member 13 and the lower surface of the table 3, thus locking the table 3 at an intended angle. As shown in FIG. 4, the second lock plate 2a is an arc-shaped thin steel plate and fixed along the inner periphery of the first lock plate 7.

The annular tilting locking member 9 is located behind and coaxially with the table locking member 8. The tilting locking member 9 is rotated to a lock position to lock the cutting machine body 10 at a lateral tilt position. The tilting locking member 9 is rotated to an unlock position to allow the cutting machine body 10 to tilt laterally.

As shown in FIG. 4, a single intermediate rod 14 is linked to the tilting locking member 9 via a gear train. The intermediate rod 14 extends in the front-rear direction below the table extension 3a and the table 3. The intermediate rod 14 has its rear portion extending to below the tilting support 20. In response to rotation of the tilting locking member 9, the intermediate rod 14 rotates about its axis. The intermediate rod 14 has its rear protruding rearward through a through-slot 31b in a tilting member 30. The intermediate rod 14 has a threaded shaft part on its rear. A pressing plate 16 is fastened to the threaded shaft part with thread engagement. The pressing plate 16 is restricted from rotating relative to the tilting member 30. A single locknut 15 is fixed at a position frontward from the pressing plate 16 and facing the front surface of a tilting mount 21 in a manner axially immovable. The locknut 15 receives a thrust bearing on its rear surface.

When the tilting locking member 9 is screwed to the lock position, a screw force from the intermediate rod 14 causes the tilting mount 21 and the tilting member 30 to be held between the locknut 15 and the pressing plate 16 in the front-rear direction. The tilting member 30 is thus locked at a tilt position. When the tilting locking member 9 is screwed to the unlock position, the holding state of the pressing plate 16 is released. This allows the tilting member 30 to be laterally tiltable. The tilt position of the cutting machine body 10 can be changed in this manner.

As shown in FIGS. 1 to 4 and 6, the tilting support 20 is located on the rear of the table 3. The tilting support 20 supports the cutting machine body 10, allowing the lateral tilt position of the cutting machine body 10 to be changed relative to the table 3.

The tilting support 20 includes the tilting mount 21 and the tilting member 30. The tilting mount 21 is integral with the rear of the table 3. A tilting part 31 is connected to the rear surface of the tilting mount 21 about a tilting shaft 22. The tilting part 31 is located in a lower portion of the tilting member 30. The tilting member 30 is connected to the tilting mount 21 in a manner laterally tiltable relative to the tilting mount 21 about the tilting shaft 22.

As shown in FIG. 3, a graduation plate 21a is attached to the upper surface of the tilting mount 21. The graduation plate 21a has angle graduations. An indicator needle 31a is attached to the front of the tilting part 31. The indicator needle 31a indicates the tilt position of the cutting machine body 10. The tilt angle of the cutting machine body 10 can be determined by reading the angle indicated by the indicator needle 31a.

The tilting locking member 9 is rotated to screw the intermediate rod 14 into the pressing plate 16. The tilting part 31 is thus locked at a tilt position relative to the tilting mount 21. The cutting machine body 10 is thus locked at the tilt position.

Figure 5:
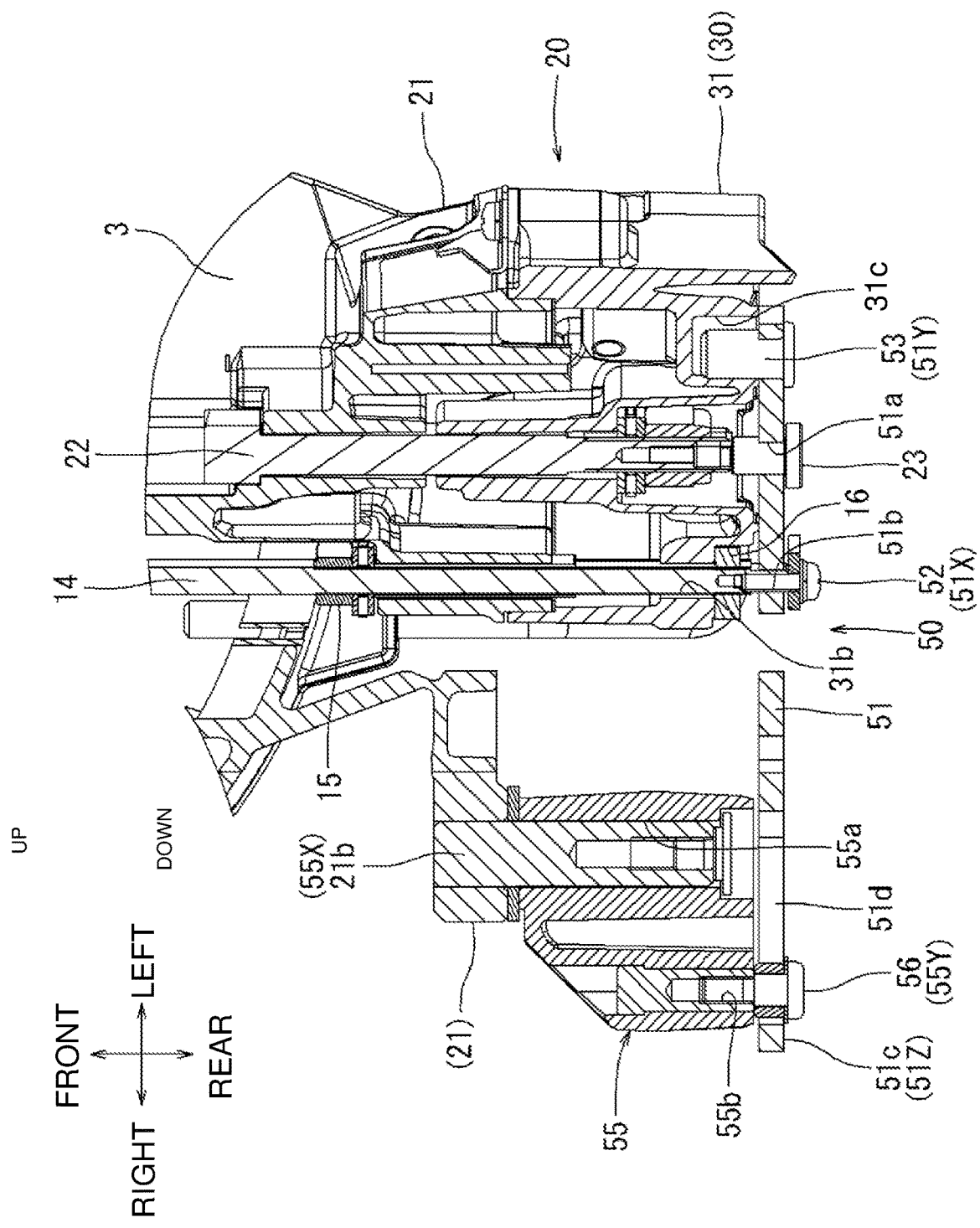
FIG. 5 is a transverse sectional view of the tilting support taken along line V-V in FIG. 2 as viewed in the direction indicated by arrows.

As shown in FIGS. 4 and 5, the intermediate rod 14 has its rear extending through the through-slot 31b to protrude from the rear surface of the tilting part 31. The through-slot 31b is arc-shaped and located in the tilting part 31. The through-slot 31b serves as a relief through which the intermediate rod 14 (a fulcrum 51X described later) is placed. A single pressing plate 16 is fastened to the protruding portion of the intermediate rod 14 with thread engagement. The intermediate rod 14 is screwed into the pressing plate 16 to cause the pressing plate 16 to be pressed against the rear surface of the tilting part 31. This locks the tilting part 31 at a tilt position relative to the tilting mount 21. Thus, the tilting locking member 9, which is located in front of the user to be easily operable, is rotated to lock or unlock the tilting support 20 at or from a tilt position.

A lever member 51 included in a fine adjuster 50 (described later) is connected to the rear end face of the protruding portion of the intermediate rod 14. The lever member 51 is connected to the rear end of the intermediate rod 14 with a connection screw 52 in a manner relatively rotatable and unremovable in the thickness direction.

Figure 1:
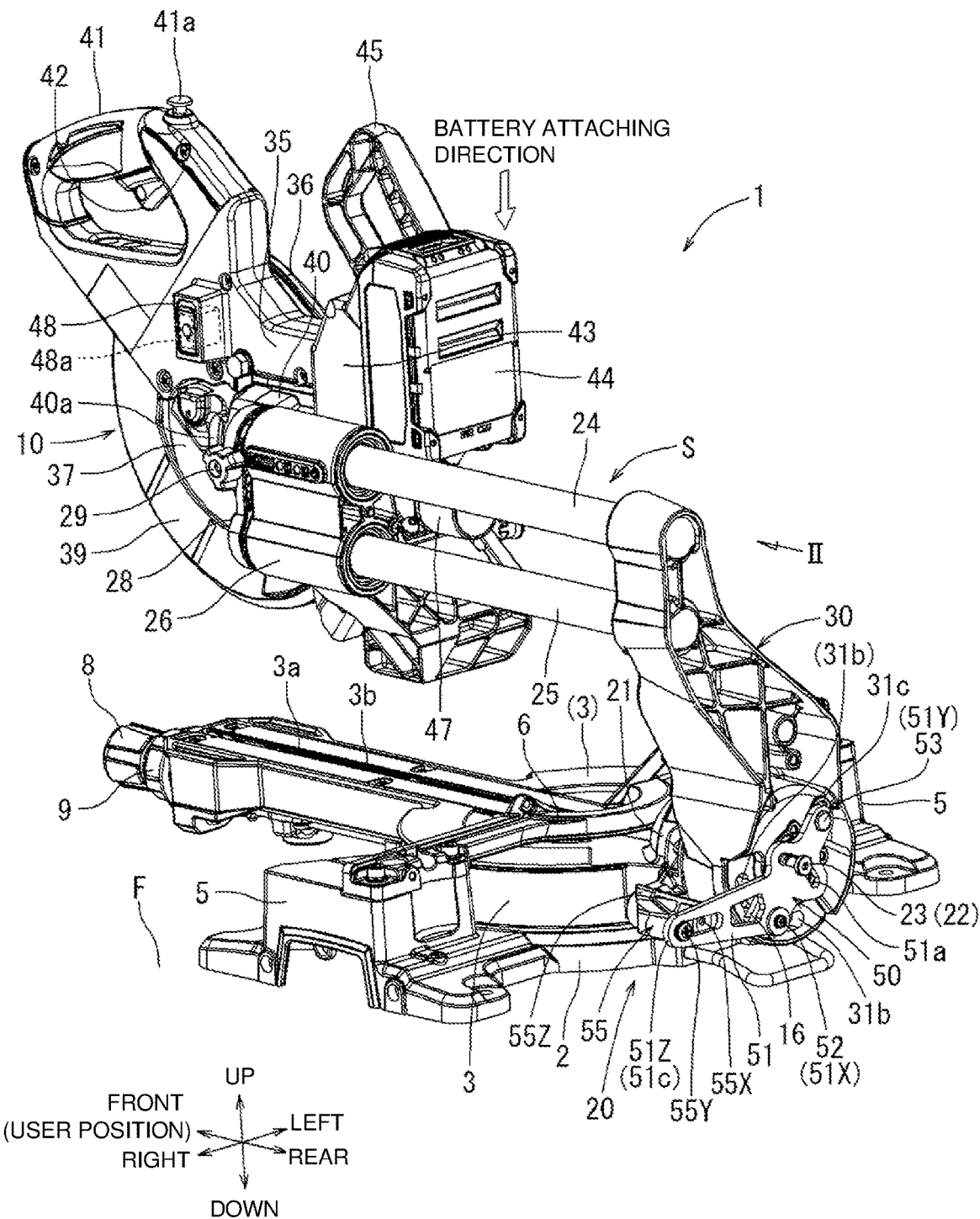
FIG. 1 is an overall perspective view of a tabletop cutting machine (cutting machine) with a cutting machine body at an orthogonal cutting position and slid frontward.
Figure 2:
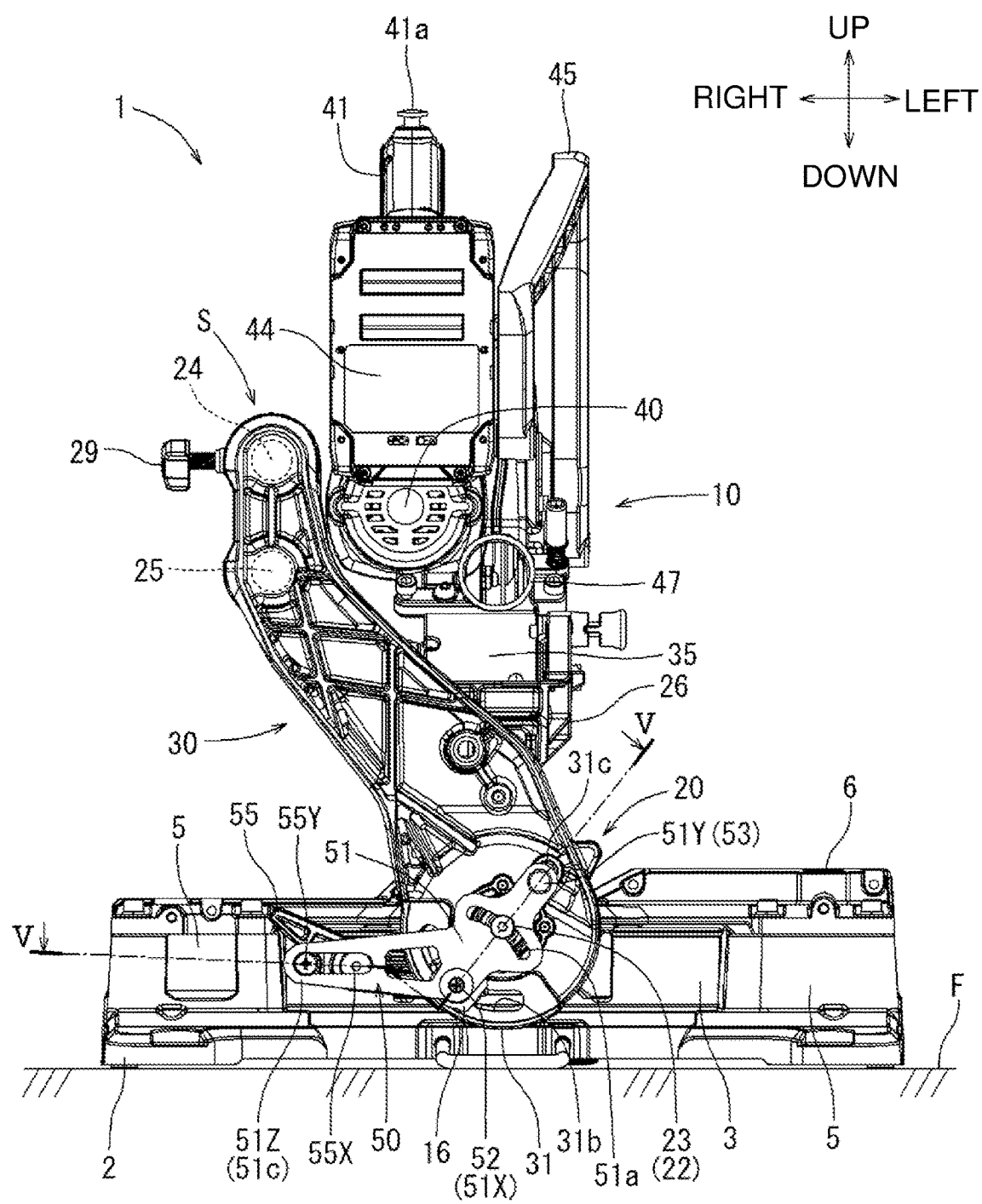
FIG. 2 is a rear view of the cutting machine as viewed in the direction indicated by arrow II in FIG. 1.

As shown in FIGS. 1 to 3, a guide pin 23 is connected to the rear end of the tilting shaft 22. The guide pin 23 is placed in an arc-shaped guide slot 51a in the lever member 51. The guide pin 23 guides the lever member 51 moving relative to the tilting shaft 22. The lever member 51 will be described in detail later.

Figure 6:
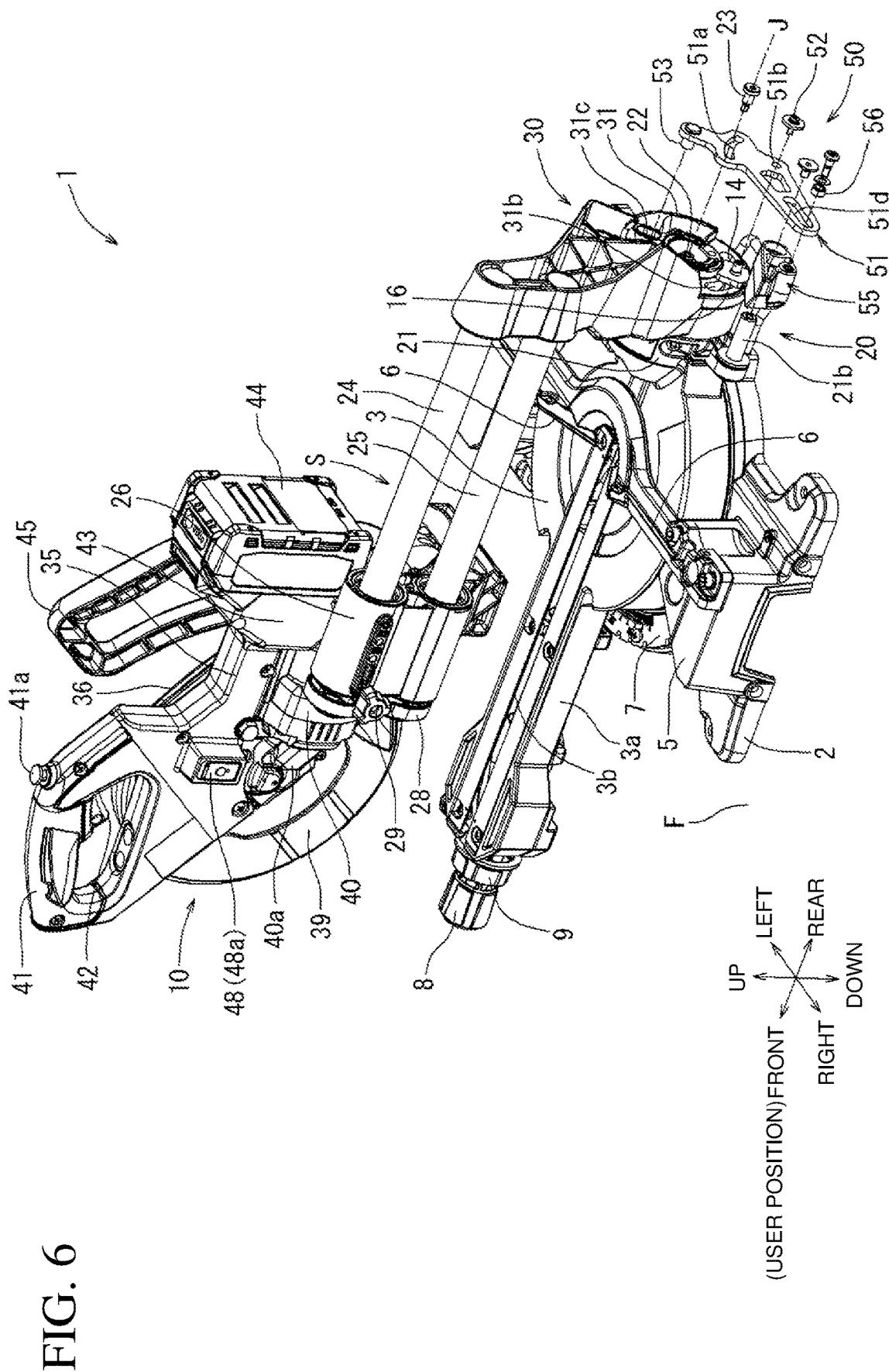
FIG. 6 is an overall perspective view of the cutting machine, showing a fine adjuster in an exploded perspective view.
Figure 7:
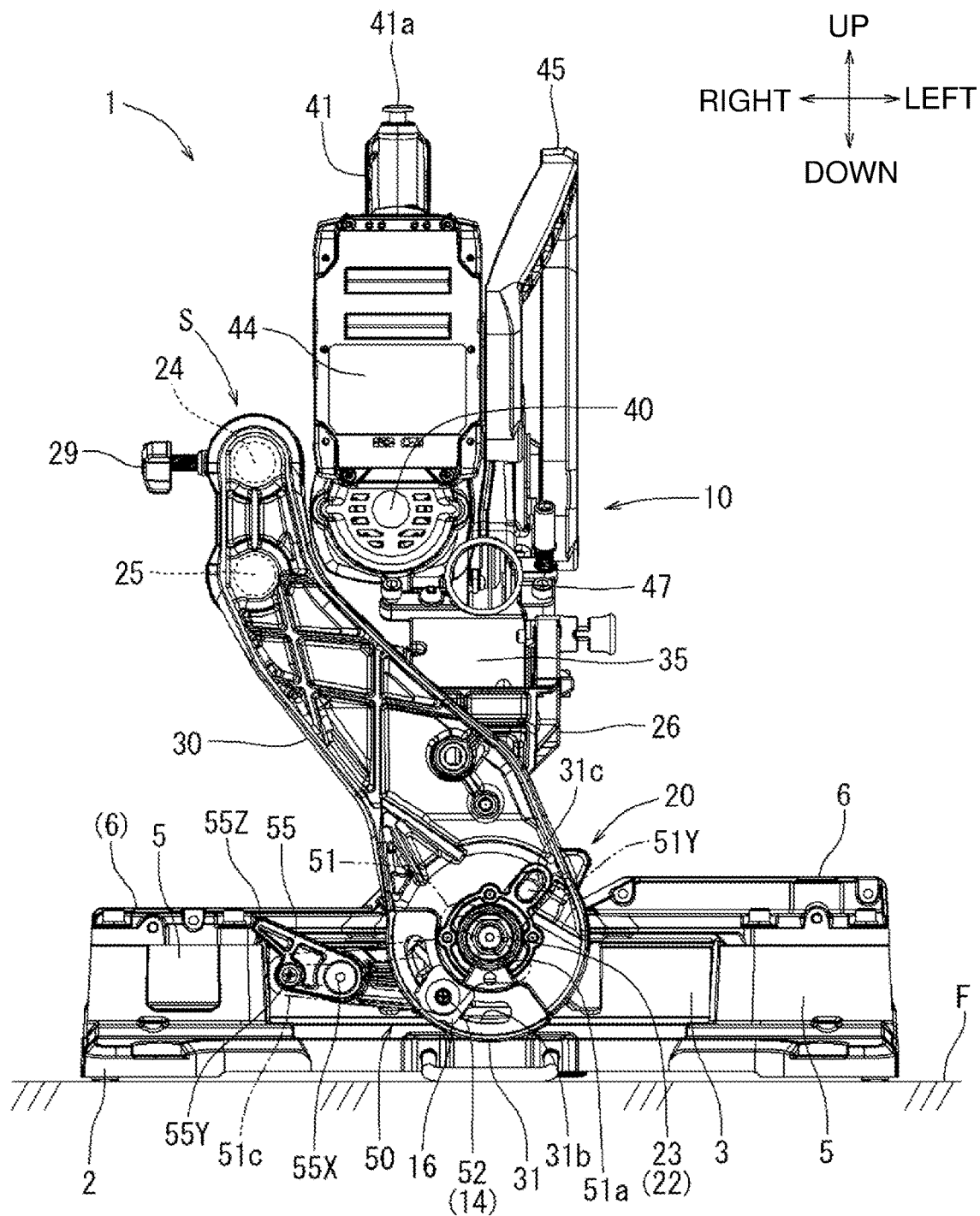
FIG. 7 is a rear view of the cutting machine, showing, differently from FIG. 2, a lever member with a two-dot chain line.

A tilting axis J about which the cutting machine body 10 is laterally tiltable is the rotation axis of the tilting part 31 with respect to the tilting mount 21, and is aligned with the axis of the tilting shaft 22. As shown in FIG. 3, the tilting axis J is aligned with the upper surface of the table 3 as viewed laterally. As shown in FIG. 6, the tilting axis J is aligned with the rotation center (support shaft 4) of the table 3 and the blade slot 3b as viewed in plan. The intermediate rod 14 is decentered by a predetermined distance from the tilting shaft 22.

A tilting positioner is accommodated between the tilting mount 21 and the tilting part 31. The tilting positioner positions the cutting machine body 10 at an orthogonal cutting position or a lateral tilt position (at 45°). One or more stoppers (not shown) for the orthogonal cutting position and one or more stoppers (not shown) for the lateral tilt positions are located near the tilting mount 21. One or more stopper screws are located near the tilting part 31. The stopper screws each come in contact with the corresponding stopper to position the cutting machine body 10 at the orthogonal cutting position or the rightward or leftward tilt position. A normal positioning operation using the tilting positioner includes rotating the tilting locking member 9 to the unlock position and releasing the locked tilting part 31 with respect to the tilting mount 21. Rotating the tilting locking member 9 to the lock position locks the cutting machine body 10 at the orthogonal cutting position or the rightward or leftward tilt position.

With the cutting machine body 10 positioned at the orthogonal cutting position, the blade cuts into the upper surface of a workpiece W at right angles (orthogonal cutting). With the cutting machine body 10 tilting rightward or leftward, the blade cuts into the upper surface of a workpiece W obliquely (oblique cutting).

The cutting machine 1 according to the present embodiment includes the fine adjuster 50 in addition to the tilting positioner. The tilting positioner positions the cutting machine body 10 at the orthogonal cutting position or a rightward or leftward tilt position at a predetermined angle. The fine adjuster 50 finely adjusts the tilt angle of the cutting machine body 10 from, for example, the orthogonal cutting position or the rightward or leftward tilt position at a predetermined angle. The fine adjuster 50 will be described in detail later.

The cutting machine body 10 is supported on an upper portion of the tilting member 30. The cutting machine body 10 is supported on a slide support S in a manner slidable in the front-rear direction. The slide support S is located at the upper portion of the tilting member 30. The slide support S includes two slide bars 24 and 25 and a slide base 26.

The two slide bars 24 and 25 are supported on the upper portion of the tilting member 30. The two slide bars 24 and 25 are elongated frontward from the upper portion of the tilting member 30. The two slide bars 24 and 25 have their front ends connected to and spaced from each other with a front end member 28. The two slide bars 24 and 25 are thus vertically parallel to each other.

The two slide bars 24 and 25 support the slide base 26 in a manner slidable in the front-rear direction between the front end member 28 at the front and the tilting member 30 at the rear. The slide base 26 supports the cutting machine body 10. Thus, the cutting machine body 10 is, above the table 3, supported in a manner slidable in the front-rear direction on the two slide bars 24 and 25. The cutting machine body 10 can be locked at a slide position in the front-rear direction by tightening a stopper screw 29. The stopper screw 29 is located on the slide base 26.

As shown in FIG. 3, the cutting machine body 10 is supported on a single swing support shaft 27 in a vertically swingable manner. The cutting machine body 10 includes a body base 35. The body base 35 has its rear supported on the slide base 26 about the swing support shaft 27. A semicircular stationary cover 36 is located on the front of the body base 35. The stationary cover 36 covers substantially the upper half of the disc-shaped blade 37.

The blade 37 is attached to a spindle (not shown) rotatably held on the body base 35. A movable cover 39 covers substantially the lower half of the blade 37. The movable cover 39 is open and closed in response to a swinging operation of the cutting machine body 10. With the cutting machine body 10 at its uppermost position (standby position), the movable cover 39 is totally closed. In this state, the movable cover 39 substantially entirely covers the lower half of the blade 37. In response to the cutting machine body 10 being swung downward, the movable cover 39 opens to expose the blade 37. The exposed portion of the blade 37 cuts into the workpiece W.

As shown in FIGS. 2 and 6, an electric motor 40 is attached to the right side of the body base 35. The electric motor 40 is a direct-current (DC) brushless motor. The electric motor 40 is accommodated in a cylindrical motor housing. The electric motor 40 is attached with its motor axis extending in the plane direction of the blade 37. Output power from the electric motor 40 is transmitted to the spindle via a meshing reduction gear train including a bevel gear accommodated in a gear case 40a.

The body base 35 has, at its front, a looped handle 41. The handle 41 includes a switch lever 42 on its upper inner periphery. The switch lever 42 is pulled with the user's fingers holding the handle 41 to activate the electric motor 40, which rotates the blade 37. As shown in FIG. 3, the blade 37 rotates in the direction (clockwise in FIG. 3) indicated by the solid-white arrow 36a on the left side of the stationary cover 36. The handle 41 includes, in its upper portion, a lock-off button 41a. The lock-off button 41a is pressed to allow an on-operation of the switch lever 42. This structure prevents the electric motor 40 from starting unexpectedly.

Behind the electric motor 40, a battery mount 43 is located on the body base 35. The battery mount 43 receives a single battery pack 44. The battery pack 44 supplies power mainly to the electric motor 40. The battery pack 44 is a hexahedral lithium-ion battery. The battery pack 44 is attached by sliding it downward relative to the battery mount 43 as indicated by the solid-white arrow in FIG. 1. The battery pack 44 can be detached from the battery mount 43 by sliding the battery pack 44 upward. The battery pack 44 is detachable and rechargeable by a separate charger and is repeatedly usable. The battery pack 44 is versatile and can also be used for other power tools.

As shown in FIG. 3, a carrying handle 45 for carrying the cutting machine 1 extends across the battery mount 43 and the rear of the stationary cover 36. With the cutting machine body 10 moved to its lowermost position, a grip 45a in the carrying handle 45 extends substantially horizontally. A user gripping the grip 45a with the cutting machine body 10 locked at the lowermost position can carry the cutting machine 1 easily.

As shown in FIGS. 1 to 3, the body base 35 receives, in its rear, a dust collection guide 46 and a hose connection port 47. With the cutting machine body 10 moved to its lowermost position (cutting position), the dust collection guide 46 is a substantially C-shaped wall in a plan view, standing vertically to have its front open. The dust collection guide 46 reduces scattering of chips generated by cutting a workpiece W backward or rightward and leftward from the blade 37.

The dust collection guide 46 has its top communicating with the hose connection port 47. A dust bag (not shown) or a dust collection hose (not shown) of a dust collector is connectable to the hose connection port 47. The chips received by the dust collection guide 46 are efficiently collected into a dust box or a dust collector. This structure reduces scattering of chips, thus maintaining a favorable work environment.

As shown in FIG. 1, an adapter compartment 48 is located on the right side surface of the body base 35. The adapter compartment 48 receives a communication adapter 48a for near field communication. The communication adapter 48a is accommodated in the adapter compartment 48 and protected from dust. The communication adapter 48a allows wireless communication between the cutting machine 1 and other attachments such as a dust collector. For example, a dust collector is activated or deactivated in response to an on- or off-operation of the switch lever 42. This structure allows efficient dust collection and improves operation efficiency.

The cutting machine body 10 is laterally tiltable relative to the table 3 (workpiece W) about the tilting support 20. The tilting locking member 9 located at the front of the table extension 3a locks the cutting machine body 10 at a lateral tilt position. Rotating the tilting locking member 9 to the unlock position allows the cutting machine body 10 to be laterally tiltable. The tilting positioner located between the tilting mount 21 and the tilting part 31 in the tilting member 30 positions the cutting machine body 10 at the orthogonal cutting position or a lateral tilt position at 45°. The tilt position at which the cutting machine body 10 is positioned by the tilting positioner can be finely adjusted by the fine adjuster 50 (described below).

Figure 8:
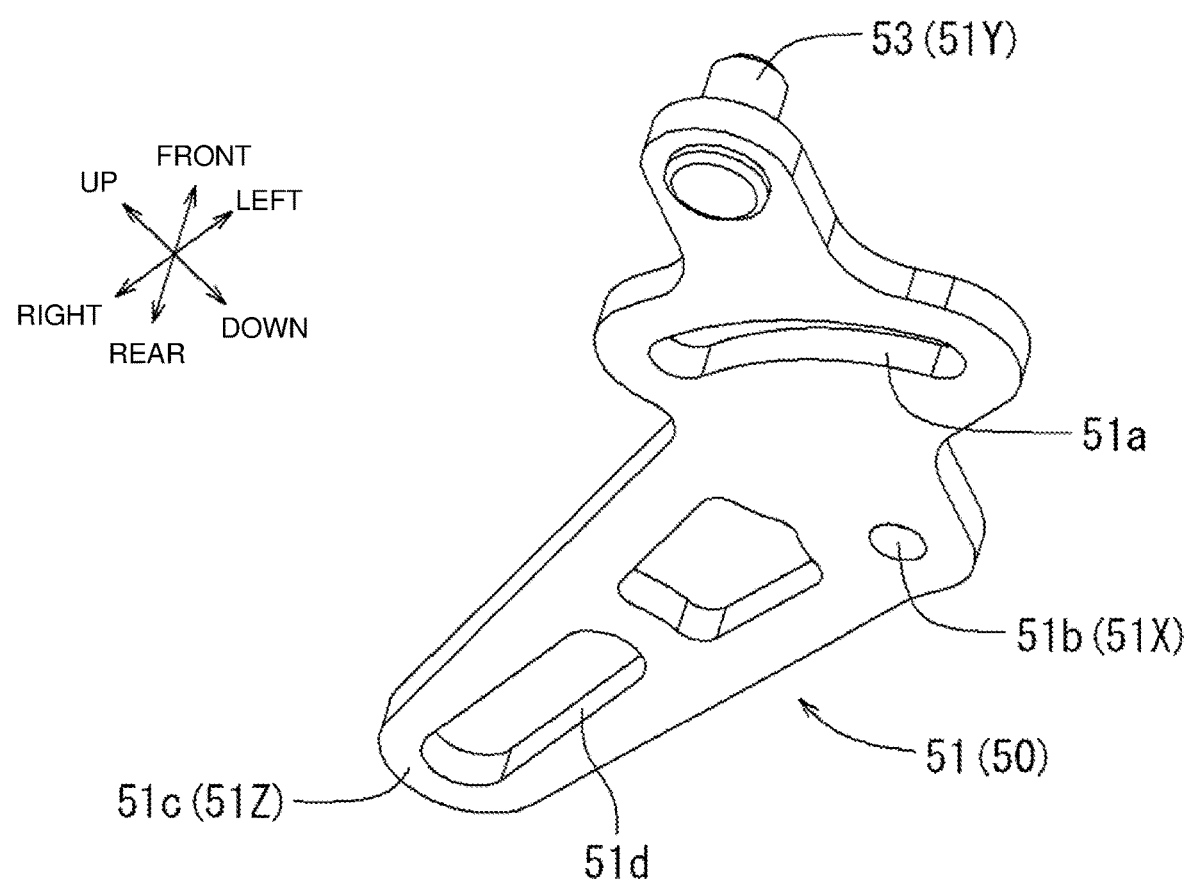
FIG. 8 is a perspective view of the lever member as viewed from the obliquely upper rear.
Figure 9:
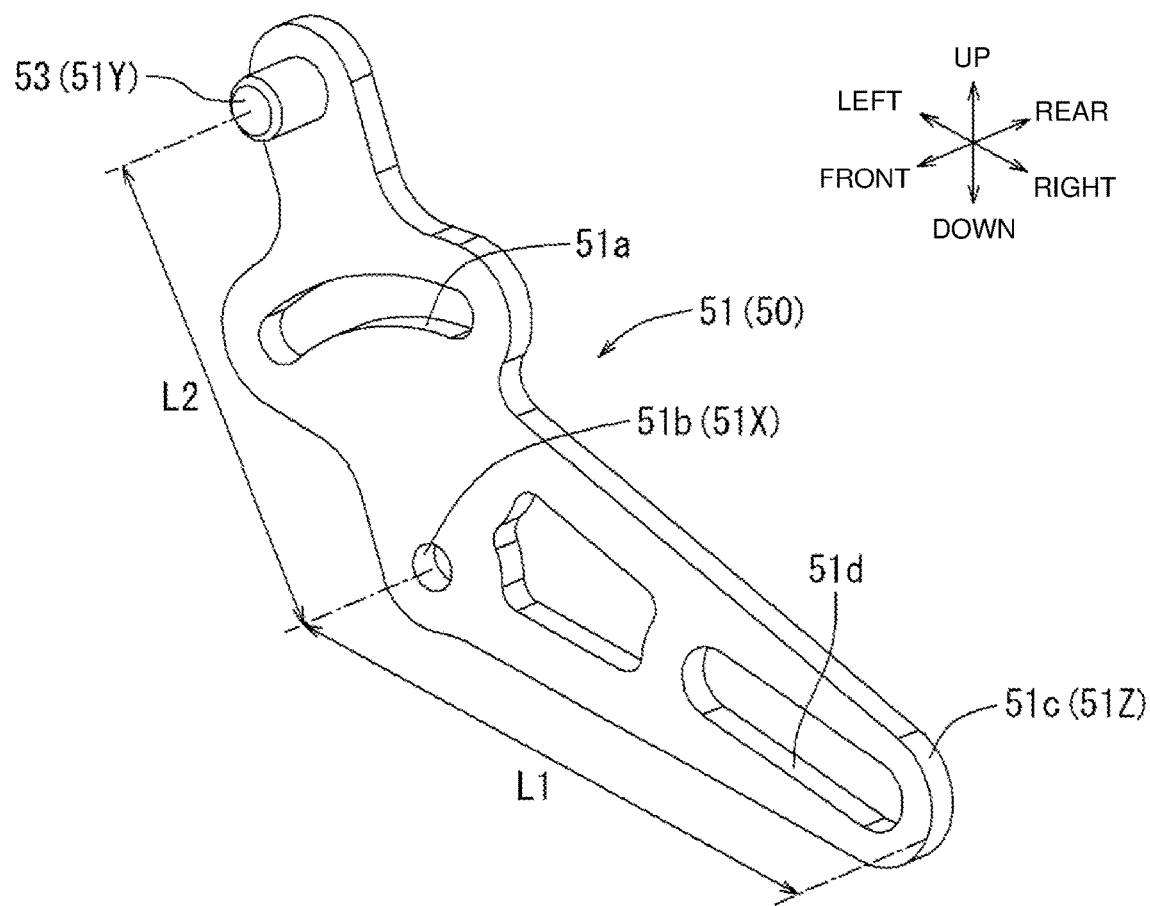
FIG. 9 is a perspective view of the lever member as viewed from the obliquely upper front.

The fine adjuster 50 is located on the rear surface of the tilting support 20. The fine adjuster 50 includes, in addition to the lever member 51, an auxiliary member 55. As shown in FIGS. 8 and 9, the lever member 51 is a steel plate that is punched into a substantially V shape curving gradually. The lever member 51 serves as leverage including the fulcrum 51X, a load point 51Y, and an effort point 51Z.

The lever member 51 is connected to the rear end of the intermediate rod 14 with the connection screw 52. The lever member 51 has a circular support hole 51b in substantially the middle in the longitudinal direction. The intermediate rod 14 has its rear placed in the support hole 51b in a relatively rotatable manner. The connection screw 52 is screwed into the rear of the intermediate rod 14 to connect the lever member 51 to the rear of the intermediate rod 14 in an unremovable manner. The lever member 51 is supported on the intermediate rod 14 in a manner pivotable along the rear surface of the tilting support 20. Thus, the central axis of the intermediate rod 14 corresponds to the fulcrum 51X in the leverage.

An actuation pin 53 is attached to the left end of the lever member 51. The actuation pin 53 protrudes frontward in the thickness direction. The actuation pin 53 is placed in an actuation groove 31c, which is an elongated groove on the rear surface of the tilting part 31. The actuation groove 31c extends in the radial direction including the tilting axis J of the tilting support 20 (the axis of the tilting shaft 22). The actuation pin 53 is placed in the actuation groove 31c in a manner movable relative to the actuation groove 31c in the radial direction including the tilting axis J. The actuation pin 53 moves in a circumferential direction about the fulcrum 51X to cause the tilting member 30 to tilt about the tilting axis J. The actuation pin 53 corresponds to the load point 51Y in the leverage.

As shown in FIGS. 1, 2, and 5, the lever member 51 has its right end being an arm 51c grippable and vertically movable by a user. The arm 51c protrudes far rightward from the rear surface of the tilting part 31. The arm 51*c* corresponds to the effort point 51Z in the leverage. When the user moves the effort point 51Z vertically, the lever member 51 tilts (pivots) vertically about the fulcrum 51X. Thus, the load point 51Y (actuation pin 53) moves about the fulcrum 51X. The actuation pin 53 relatively moves in the actuation groove 31*c* in the longitudinal direction while exerting a force on a side wall of the actuation groove 31*c* to cause the tilting member 30 to laterally tilt about the tilting axis J. The actuation groove 31*c* serves as a relief groove to allow radial movement of the actuation pin 53, which results from the fulcrum 51X decentered from the tilting axis J.

When the arm 51*c* is pressed downward, the tilting member 30 tilts rightward. When the arm 51*c* is pressed upward, the tilting member 30 tilts leftward. In this manner, the pivoting direction of the lever member 51 matches the tilting direction of the cutting machine body 10. This structure allows the lever member 51 to be intuitively operable and improves the operability of the fine adjuster 50.

As shown in FIG. 9, a first line connecting the fulcrum 51X and the effort point 51Z and a second line connecting the fulcrum 51X and the load point 51Y form an obtuse angle of about 120° between them. Thus, the lever member 51 is bent in a substantially V shape (mountain shape) with the fulcrum 51X at the center. A distance L1 between the fulcrum 51X and the effort point 51Z is greater than a distance L2 between the fulcrum 51X and the load point 51Y. In this manner, the arm 51*c* protrudes from the tilting part 31 by an appropriate degree. The lever member 51 with the distance L1 greater than the distance L2 serves as leverage. The lateral tilt position of the cutting machine body 10 can thus be finely adjusted with a small operational force.

Figure 10:
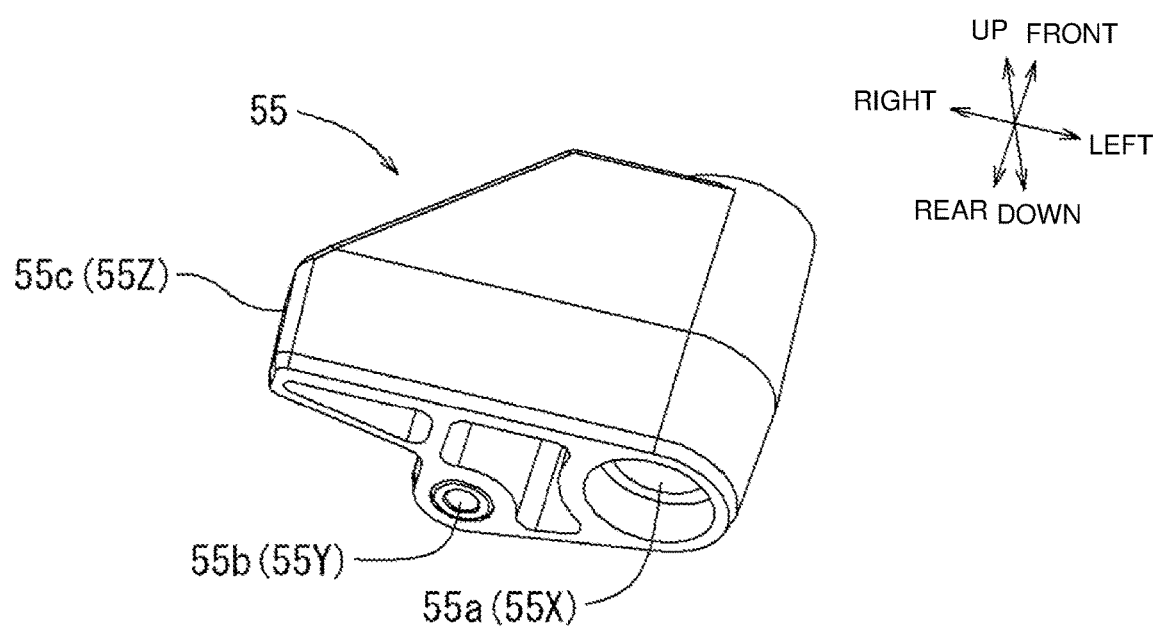
FIG. 10 is a perspective view of an auxiliary member as viewed from the obliquely upper rear.
Figure 11:
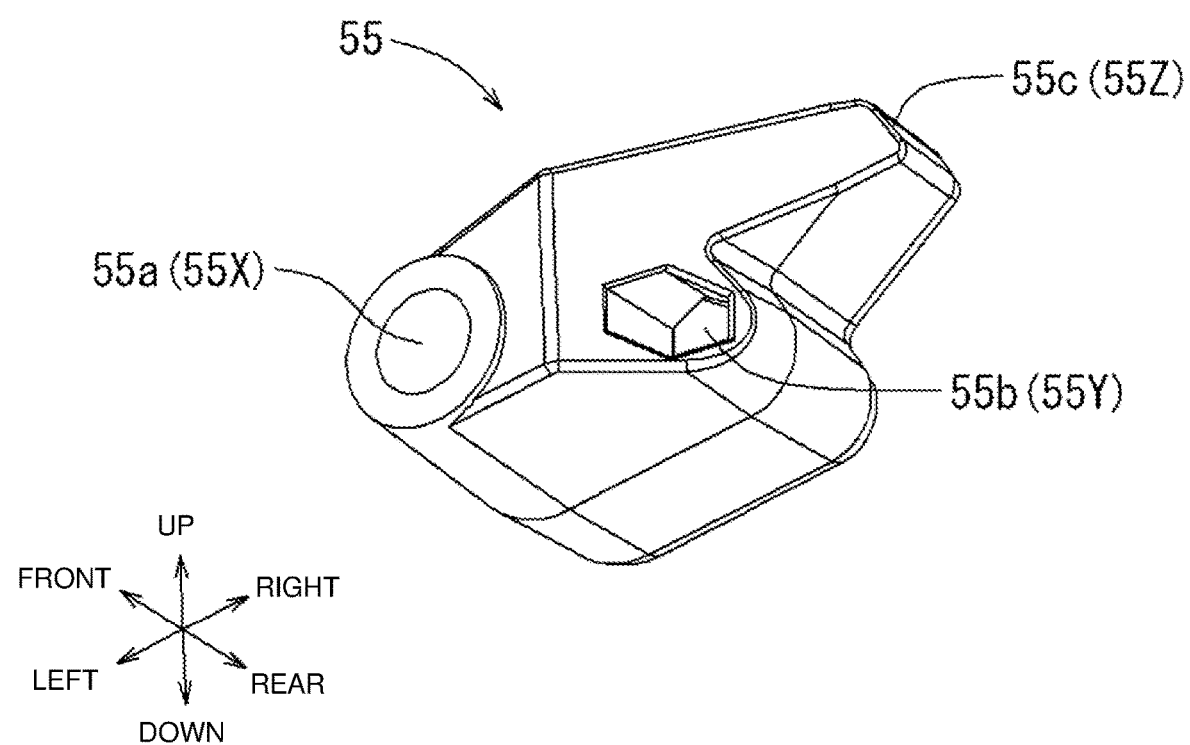
FIG. 11 is a perspective view of the auxiliary member as viewed from the obliquely lower front.

The auxiliary member 55 is located between the effort point 51Z and the tilting mount 21. As shown in FIGS. 10 and 11, the auxiliary member 55 has an auxiliary fulcrum 55X, an auxiliary load point 55Y, and an auxiliary effort point 55Z. The auxiliary member 55 has a support hole 55*a* in the left end. As shown in FIG. 5, the support hole 55*a* receives a support shaft 21*b* on the tilting mount 21. The support shaft 21*b* is parallel to the intermediate rod 14. The auxiliary member 55 is supported on the support shaft 21*b* in a vertically pivotable manner. The support shaft 21*b* received in the support hole 55*a* corresponds to the auxiliary fulcrum 55X in the leverage. Thus, the pivot axis of the auxiliary fulcrum 55X in the auxiliary member 55 is parallel to the pivot axis of the fulcrum 51X in the lever member 51.

A single screw hole 55*b* is located rightward from the support hole 55*a* (auxiliary fulcrum 55X). The screw hole 55*b* receives a guide roller 56. The guide roller 56 is placed in a guide slot 51*d* in the arm 51*c* (effort point 51Z). The guide slot 51*d* extends in the longitudinal direction of the arm 51*c*. The guide roller 56 corresponds to the auxiliary load point 55Y in the auxiliary member 55.

The auxiliary member 55 includes an arm 55*c* protruding farther rightward from the auxiliary load point 55Y. The distal end of the arm 55*c* mainly corresponds to the auxiliary effort point 55Z in the leverage. Similarly to the lever member 51, the arm 55*c* protrudes by an appropriate degree to have the distance between the auxiliary fulcrum 55X and the auxiliary effort point 55Z being greater than the distance between the auxiliary fulcrum 55X and the auxiliary load point 55Y. Thus, the auxiliary member 55 serves as leverage for moving the lever member 51 vertically.

When the auxiliary effort point 55Z is moved vertically, the auxiliary load point 55Y moves vertically about the auxiliary fulcrum 55X. The auxiliary load point 55Y moving vertically moves the effort point 51Z in the lever member 51 vertically. This structure allows the lateral tilt position of the tilting member 30 to be finely adjusted.

The lever member 51 serving as leverage is vertically movable by the auxiliary member 55, which also serves as leverage. This allows the user to finely adjust the tilt position of the cutting machine body 10 by vertically operating the auxiliary effort point 55Z in the auxiliary member 55 with a smaller force. As with the tilting positioner (positive stop assembly), the fine adjuster 50 performs fine adjustment with the tilting locking member 9 in an unlocked state.

Figure 12:
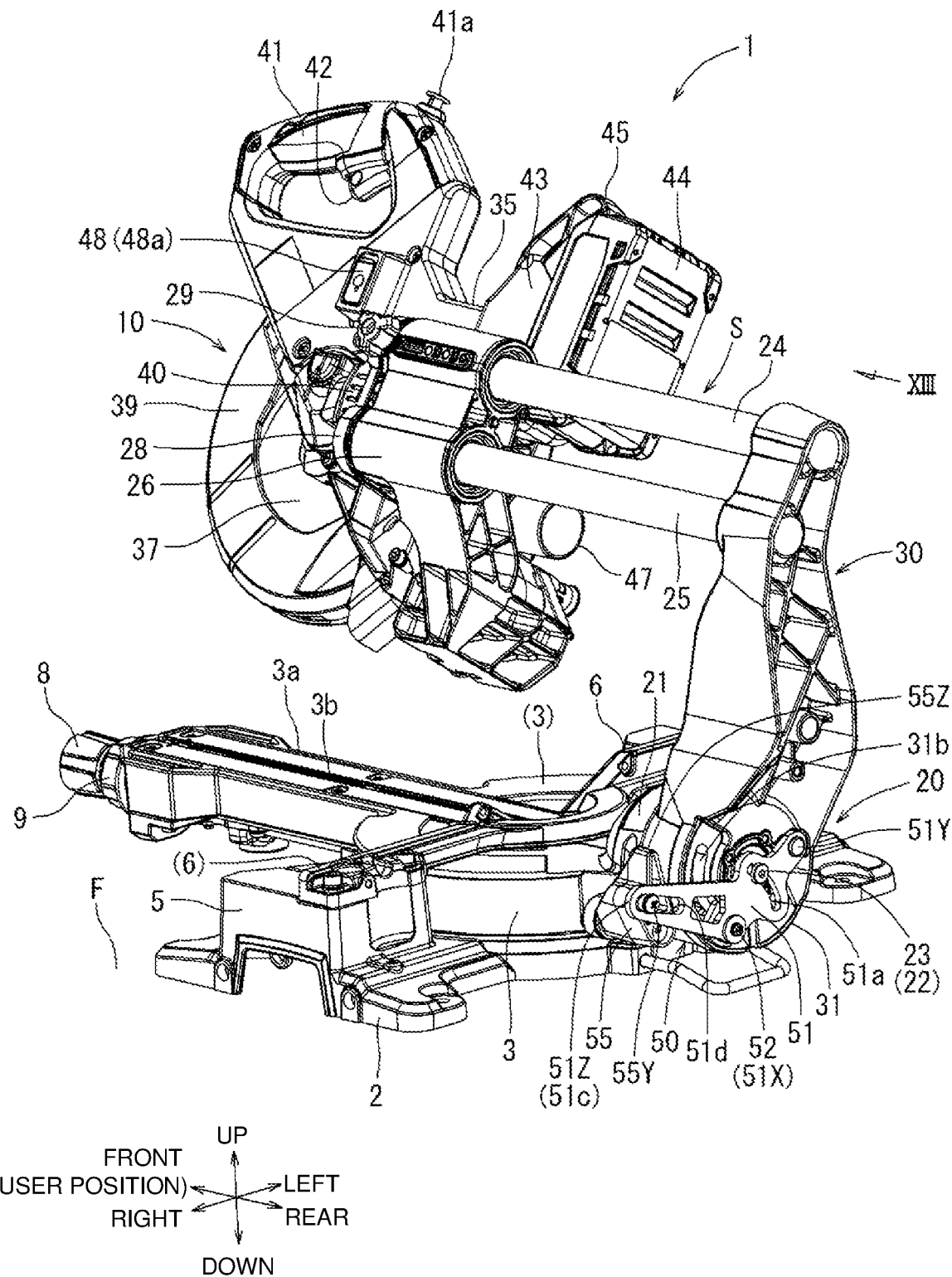
FIG. 12 is an overall perspective view of the cutting machine with the cutting machine body tilting leftward as viewed from the obliquely upper right rear.
Figure 13:
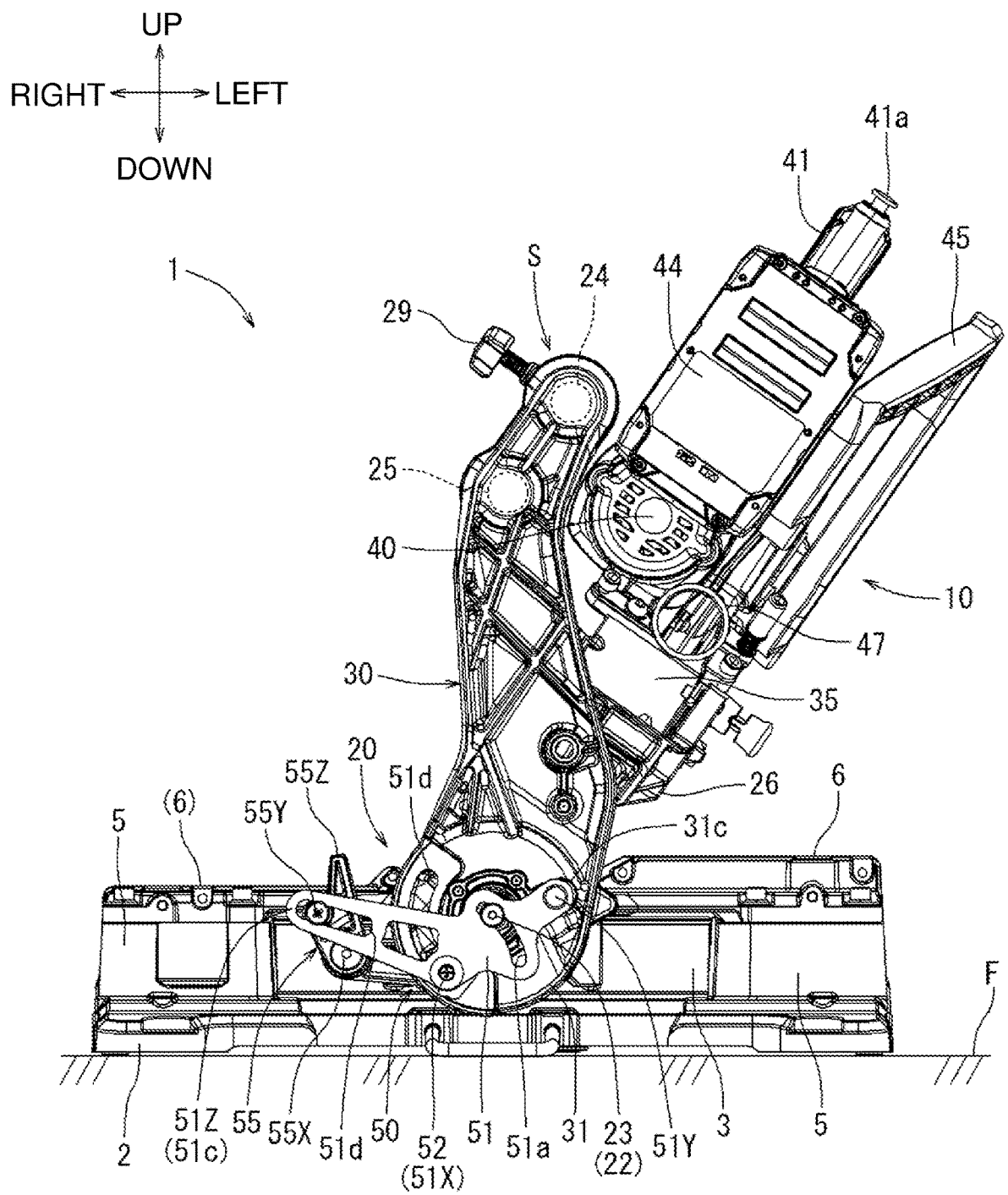
FIG. 13 is a rear view of the cutting machine as viewed in the direction indicated by arrow XIII in FIG. 12.

As shown in FIGS. 12 and 13, the fine adjuster 50 may be operated with the cutting machine body 10 tilting leftward by, for example, 30° by the tilting positioner. When the auxiliary effort point 55Z in the auxiliary member 55 is pressed upward, the effort point 51Z in the lever member 51 also moves upward. The lever member 51 thus pivots clockwise about the fulcrum 51X in FIG. 13. The load point 51Y in the lever member 51 thus moves downward. The tilting member 30 then tilts in the direction in which its upper portion moves leftward. This causes the cutting machine body 10 to tilt further leftward by several degrees from the tilt position at 30° leftward, finely adjusting the leftward tilt angle to be greater than 30°.

When the auxiliary effort point 55Z in the auxiliary member 55 is pressed downward, the effort point 51Z in the lever member 51 moves downward and the load point 51Y moves upward. This causes the tilting member 30 to tilt in the direction in which its upper portion moves rightward. The leftward tilt angle of the cutting machine body 10 is thus finely adjusted to be less than 30°.

After fine adjustment, the locking operation on the tilting locking member 9 locks the cutting machine body 10 at the tilt position that has been finely adjusted.

Figure 14:
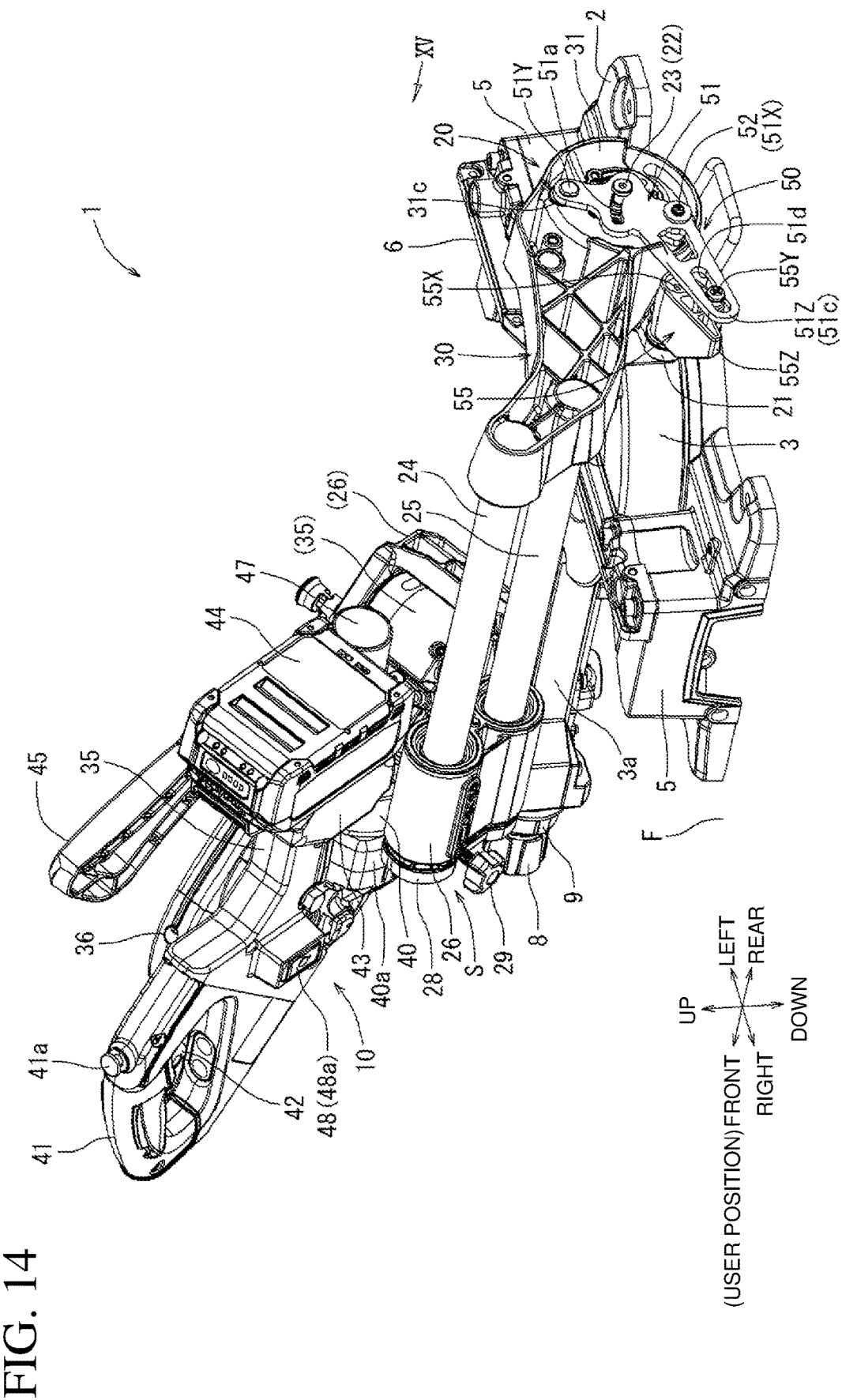
FIG. 14 is an overall perspective view of the cutting machine with the cutting machine body tilting rightward as viewed from the obliquely upper right rear.
Figure 15:
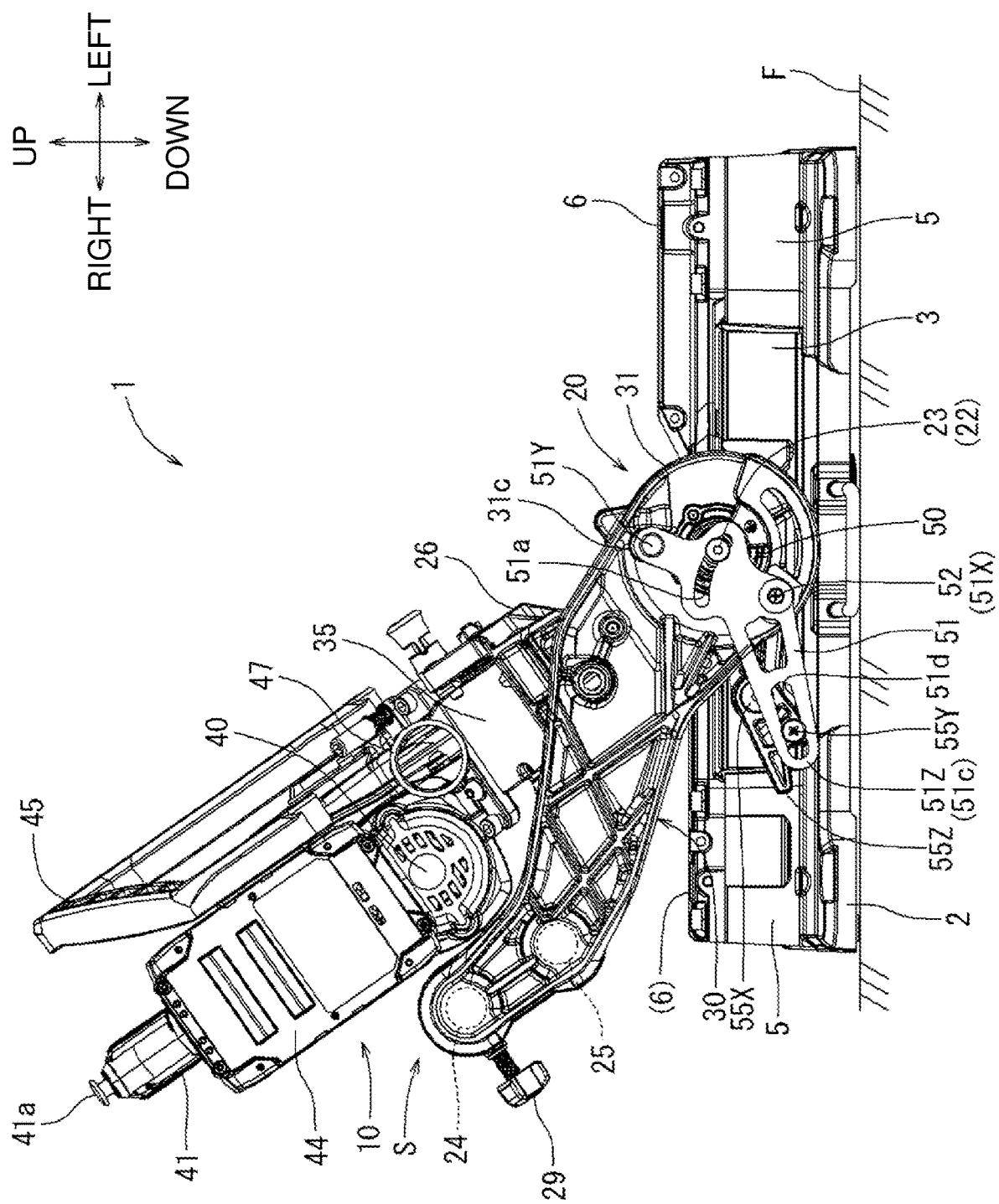
FIG. 15 is a rear view of the cutting machine as viewed in the direction indicated by arrow XV in FIG. 14.

As shown in FIGS. 14 and 15, the fine adjuster 50 may be operated with the cutting machine body 10 tilting rightward by, for example, 30° by the tilting positioner. When the auxiliary effort point 55Z in the auxiliary member 55 is pressed downward, the effort point 51Z in the lever member 51 also moves downward. The lever member 51 thus pivots counterclockwise about the fulcrum 51X in FIG. 15. The load point 51Y in the lever member 51 thus moves upward. The tilting member 30 then tilts in the direction in which its upper portion moves rightward. This causes the cutting machine body 10 to tilt further rightward by several degrees from the tilt position at 30° rightward, finely adjusting the rightward tilt angle to be greater than 30°.

When the auxiliary effort point 55Z in the auxiliary member 55 is pressed upward, the effort point 51Z in the lever member 51 moves upward and the load point 51Y moves downward. This causes the tilting member 30 to tilt in the direction in which its upper portion moves leftward. The rightward tilt angle of the cutting machine body 10 is thus finely adjusted to be less than 30°.

After fine adjustment, the locking operation is performed with the tilting locking member 9 to lock the cutting machine body 10 at the tilt position that has been finely adjusted.

The fine adjuster 50 finely adjusts the orthogonal cutting position or a tilt position at 45° at which the cutting machine body 10 is positioned in the normal positioning operation using the tilting positioner. In addition, the fine adjuster 50 can be used independently of the tilting positioner. With the tilting locking member 9 in an unlocked state, the fine adjuster 50 can finely adjust the tilt angle of the cutting machine body 10 to a tilt angle of, for example, 10° or 20°, at which the cutting machine body 10 cannot be positioned in the normal positioning operation using the tilting positioner.

The cutting machine 1 according to the present embodiment includes the fine adjuster 50 including the lever member 51 and the auxiliary member 55 each serving as leverage to allow the tilt position of the cutting machine body 10 to be finely adjusted with a smaller force. When the fine adjuster 50 is not in use in the normal positioning operation in which the tilting positioner positions the cutting machine body 10 at the orthogonal cutting position or a tilt position at 45°, the fine adjuster 50 adds no great resistance on operation. Thus, the operability of the tilting positioner is maintained. In the normal positioning operation using the tilting positioner, no unlocking operation is to be performed specifically for the fine adjuster 50, unlike with the known structure. This improves the operability of the tilting positioner and simplifies the structure of the tilting support 20.

The lever member 51 in one or more embodiments has the fulcrum 51X in its middle area in the longitudinal direction. The lever member 51 has the load point 51Y at the left end (first end) in the longitudinal direction and the effort point 51Z at the right end (second end) in the longitudinal direction, with the fulcrum 51X between the load point 51Y and the effort point 51Z. The lever member 51 thus serves as leverage to efficiently transmit an operational force applied to the effort point 51Z to the load point 51Y.

The first line connecting the effort point 51Z and the fulcrum 51X and the second line connecting the load point 51Y and the fulcrum 51X form an obtuse angle (about 120°). This structure efficiently transmits an operational force applied to the effort point 51Z to the load point 51Y.

The effort point 51Z is located on the arm 51c, which protrudes laterally from the fulcrum 51X farther than a side of the tilting member 30. This structure allows a smaller operational force to be applied to the effort point 51Z.

The fine adjuster 50 in one or more embodiments includes the auxiliary member 55 between the lever member 51 and the tilting mount 21 tiltably supporting the tilting member 30. The auxiliary member 55 has the auxiliary fulcrum 55X, the auxiliary load point 55Y, and the auxiliary effort point 55Z. The lever member 51 serving as leverage to tilt the tilting member 30 is operable by the auxiliary member 55, which also serves as leverage. This structure allows the user to finely adjust the tilt position of the tilting member 30 by operating the auxiliary member 55 with a smaller force. This further improves the operability of the fine adjuster 50.

The tilting member 30 and the auxiliary member 55 in the fine adjuster 50 in one or more embodiments are located frontward from the lever member 51 in the direction of the tilting axis J of the tilting member 30. The lever member 51 and the auxiliary member 55 use a smaller space in the direction of the tilting axis J with respect to the tilting member 30.

The rotation axis of the fulcrum 51X (intermediate rod 14) in the lever member 51 and the rotation axis of the auxiliary fulcrum 55X (support shaft 21b) in the auxiliary member 55 are parallel to each other. Thus, the operation direction of the auxiliary member 55 matches the tilting direction of the cutting machine body 10, allowing the auxiliary member 55 to be intuitively operable. Thus, both the lever member 51 and the auxiliary member 55 are intuitively operable. This further improves the operability of the fine adjuster 50.

The fulcrum 51X in the lever member 51 is coupled to the table 3 (tilting mount 21) through the relief (through-slot 31b) in the tilting member 30. Thus, the fulcrum 51X in the lever member 51 is located closer to the tilting axis J of the tilting member 30. The principle of the leverage can thus be more efficiently applied.

The through-slot 31b serving as the relief is an elongated slot along an arc having the center aligned with the tilting axis J of the tilting member 30. This structure is less likely to cause a large decrease in the strength of the tilting member 30 than a structure including the tilting part 31 with a relief that is cut out in the circumferential direction.

The above embodiments may be modified variously. For example, the auxiliary member 55 may be eliminated. In this case, the effort point 51Z in the lever member 51 may be directly gripped and vertically operated to finely adjust the lateral tilt position of the cutting machine body 10.

Although the lever member 51 has the guide slot 51a that receives the guide pin 23 in the above embodiment, the guide slot 51a and the guide pin 23 may be eliminated.

Although the lever member 51 includes the arm 51c protruding rightward from the tilting part 31 and the auxiliary member 55 are located rightward from the tilting part 31 in the above embodiment, the arm may protrude leftward and the auxiliary member 55 may be located leftward from the tilting part 31.

Although the lever member 51 has the fulcrum 51X in its middle portion in the longitudinal direction, the load point 51Y at one end, and the effort point 51Z at the other end with the fulcrum 51X between the load point 51Y and the effort point 51Z in the above embodiment, the load point may be located between the fulcrum and the effort point.

Although the auxiliary load point 55Y is located between the auxiliary fulcrum 55X and the auxiliary effort point 55Z in the above embodiment, the auxiliary load point may be located at one end and the auxiliary effort point may be located at the other end with the auxiliary fulcrum between the auxiliary load point and the auxiliary effort point, as with the lever member 51.

Although the lever member 51 has the fulcrum 51X (the axis of the intermediate rod 14) decentered from the tilting center (tilting axis J) of the tilting member 30 in the above embodiment, the lever member 51 may have the fulcrum located on the tilting axis J.

Although the cutting machine 1 is a sliding circular saw including the slide support S along which the cutting machine body 10 is slidable in the front-rear direction in the above embodiment, the fine adjuster 50 may also be used with a tabletop circular saw including no slide support S.

REFERENCE SIGNS LIST

W workpiece
F floor surface
1 tabletop cutting machine or cutting machine (sliding circular saw)
2 base
2a second lock plate
3 table
3a table extension
3b blade slot
4 support shaft
5 auxiliary table
6 positioning fence
6a positioning surface
7 first lock plate
7a positioning recess
8 table locking member
8a threaded shaft part
9 tilting locking member 10 cutting machine body
11 positioning pin
11a compression spring
12 actuation shaft
13 pressing member
13a support shaft
14 intermediate rod
15 locknut
16 pressing plate
20 tilting support
21 tilting mount
21a graduation plate
21b support shaft
22 tilting shaft
J tilting axis
23 guide pin
S slide support
24 (upper) slide bar
25 (lower) slide bar
26 slide base
27 swing support shaft
28 front end member
29 stopper screw
30 tilting member
31 tilting part
31a indicator needle
31b through-slot
31c actuation groove
35 body base
36 stationary cover
36a solid-white arrow
37 blade
39 movable cover
40 motor housing (electric motor)
40a gear case (reduction gear train)
41 handle
41a lock-off button
42 switch lever
43 battery mount
44 battery pack
45 carrying handle
45a grip
46 dust collection guide
47 hose connection port
48 adapter compartment
48a communication adapter
50 fine adjuster
51 lever member
51a guide slot
51b support hole
51c arm
51d guide slot
51X fulcrum
51Y load point
51Z effort point
L1 distance of first line
L2 distance of second line
52 connection screw
53 actuation pin
55 auxiliary member
55a support hole
55b screw hole
55c arm
55X auxiliary fulcrum
55Y auxiliary load point
55Z auxiliary effort point
56 guide roller

What is claimed is:

1. A cutting machine, comprising:
a table on which a workpiece is placeable;
a cutting machine body vertically movable relative to the table, the cutting machine body capable of holding a blade;
a tilting body supporting the cutting machine body in a manner laterally tiltable relative to the table;
a tilting lock configured to lock the cutting machine body at a tilt position;
a lever member operable to adjust the tilt position of the cutting machine body in an unlocked state of the tilting lock, the lever member including
a fulcrum directly or indirectly coupled to the table in a manner rotatable about an axis,
a load point portion coupled to the tilting body, and
an effort point portion extending from the fulcrum and located at a distance from the fulcrum greater than a distance between the fulcrum and the load point portion; and
a tilting mount tiltably supporting the tilting body; and
an auxiliary member between the lever member and the tilting mount, the auxiliary member including an auxiliary fulcrum, an auxiliary load point portion, and an auxiliary effort point portion,
wherein one of the auxiliary fulcrum or the auxiliary load point portion is coupled to the tilting mount and another of the auxiliary fulcrum or the auxiliary load point portion is coupled to the lever member, and
wherein a distance between the auxiliary effort point portion and the auxiliary fulcrum is greater than a distance between the auxiliary load point portion and the auxiliary fulcrum.

2. The cutting machine according to claim 1, wherein the lever member includes
the fulcrum in a middle area of the lever member in a longitudinal direction,
the load point portion at a first end of the lever member in the longitudinal direction, and
the effort point portion at a second end of the lever member in the longitudinal direction, with the fulcrum between the load point portion and the effort point portion.

3. The cutting machine according to claim 2, wherein the effort point portion protrudes laterally from the fulcrum farther than a side of the tilting body and is vertically tiltable.

4. The cutting machine according to claim 2, wherein the tilting body has a relief, and
the fulcrum is coupled to the table through the relief.

5. The cutting machine according to claim 1, wherein the effort point portion protrudes laterally from the fulcrum farther than a side of the tilting body and is vertically tiltable.

6. The cutting machine according to claim 5, wherein the tilting body has a relief, and
the fulcrum is coupled to the table through the relief.

7. The cutting machine according to claim 1, wherein the auxiliary fulcrum is coupled to the tilting mount, and the auxiliary load point portion is coupled to the effort point portion in the lever member.

8. The cutting machine according to claim 7, wherein the tilting body and the auxiliary member are located frontward from the lever member in a direction of a tilting axis of the tilting body.

9. The cutting machine according to claim 7, wherein
the fulcrum and the auxiliary fulcrum each include a rotation axis, and the rotation axis of the fulcrum and the rotation axis of the auxiliary fulcrum are parallel to each other.

10. The cutting machine according to claim 7, wherein
the tilting body has a relief, and
the fulcrum is coupled to the table through the relief.

11. The cutting machine according to claim 1, wherein
the tilting body and the auxiliary member are located frontward from the lever member in a direction of a tilting axis of the tilting body.

12. The cutting machine according to claim 11, wherein
the fulcrum and the auxiliary fulcrum each include a rotation axis, and the rotation axis of the fulcrum and the rotation axis of the auxiliary fulcrum are parallel to each other.

13. The cutting machine according to claim 1, wherein
the fulcrum and the auxiliary fulcrum each include a rotation axis, and the rotation axis of the fulcrum and the rotation axis of the auxiliary fulcrum are parallel to each other.

14. The cutting machine according to claim 1, wherein
the tilting body has a relief, and
the fulcrum is coupled to the table through the relief.

15. The cutting machine according to claim 14, wherein
the relief includes an elongated slot along an arc having a center aligned with a tilting axis of the tilting body.

16. A cutting machine, comprising:
a table on which a workpiece is placeable;
a cutting machine body vertically movable relative to the table, the cutting machine body capable of holding a blade;
a tilting body supporting the cutting machine body in a manner laterally tiltable relative to the table;
a tilting lock configured to lock the cutting machine body at a tilt position;
a lever member operable to adjust the tilt position of the cutting machine body in an unlocked state of the tilting lock, the lever member including
    a fulcrum coupled to the table in a manner rotatable about an axis,
    a load point portion coupled to the tilting body, and
    an arm extending from the fulcrum;
a tilting mount tiltably supporting the tilting body; and
an auxiliary member between the lever member and the tilting mount, the auxiliary member including an auxiliary fulcrum, an auxiliary load point portion, and an auxiliary effort point portion,
    wherein one of the auxiliary fulcrum or the auxiliary load point portion is coupled to the tilting mount and another of the auxiliary fulcrum or the auxiliary load point portion is coupled to the lever member, and
    wherein a distance between the auxiliary effort point portion and the auxiliary fulcrum is greater than a distance between the auxiliary load point portion and the auxiliary fulcrum.

\* \* \* \* \*